United States Patent
Lauck, III

[15] 3,679,872
[45] July 25, 1972

[54] SELF COMPENSATING CONTROL CIRCUIT

[72] Inventor: Peter Lauck, III, Princeton, N.J.

[73] Assignee: Robert H. Myers, Washington, D.C. ; a part interest

[22] Filed: Aug. 3, 1971

[21] Appl. No.: 168,614

[52] U.S. Cl. .............................................. 219/501
[51] Int. Cl. ........................................... H05b 1/02
[58] Field of Search ................. 219/501, 504, 505, 212

[56] References Cited

UNITED STATES PATENTS

| | | | |
|---|---|---|---|
| 3,422,244 | 1/1969 | Lauck | 219/212 |
| 3,437,792 | 4/1969 | Lauck | 219/505 |
| 3,544,767 | 12/1970 | Lauck | 219/501 |
| 3,564,206 | 2/1971 | Lauck | 219/501 |

Primary Examiner—George Harris
Assistant Examiner—F. E. Bell
Attorney—J. Gibson Semmes

[57] ABSTRACT

A temperature compensating control device for blankets, wall wire or outlet or fuse breaking devices, which incorporates solid on/off control. The use of solid on/off control with resistance temperature compensation sensors rather than a phase control renders the circuit free of "gate trigger" means normally associated with simplified thyristor circuits. This simplifies greatly the transistor stage gain or transistor shunt controls previously demonstrated in the art. Intrinsic simplification with fewer parts and solid state temperature resistance compensating means of the thyristor itself are innovative, besides requiring fewer parts. The circuits incorporates, preferably a temperature override electromechanical heat sensitive, fail safe control regulator and additionally in one aspect a double-stranded wire fail safe means for temperature responsive means. A thyristor SCR is incorporated in the circuit and functions in such a manner as to give snap on or off control.

12 Claims, 3 Drawing Figures

3,679,872

INVENTOR
PETER LAUCK, III

J Gibson Semmes
ATTORNEY

SELF COMPENSATING CONTROL CIRCUIT

BACKGROUND OF THE INVENTION

1. Field of the Invention

The invention has particular use in applications utilizing heating devices in which activation of the heating element is controlled by a circuit including means acting as a temperature sensor and control activator for the heating device. The invention has a particular use in applications such as electric blankets, or other electrically heated fabrics or materials such as woven or non-woven drapes, floor coverings, mobile home wall wiring and the like, for better additional and different consumer protection than that presently provided. It also provides oil burner temperature control with fail safe receptacles or wall wire, wall outlet and fuse protection for overloaded conditions. It is commercially simplified also.

2. Description of the Prior Art

The prior art discloses utilization of heating devices in, for example, flexible blankets and heating devices, in which actuation of the heating element is controlled by temperature control sensors or actuators such as bi-metallic switches, thermostats, silicon controlled rectifier (SCR) circuits, thyristor circuits and the like. Related inventions disclosing circuitry to which the present invention is applicable include:

P. Lauck, III - U.S. Pat. No. 3,385,958 issued May 28, 1968 entitled ELECTRIC BLANKET;

P. Lauck, III - U.S. Pat. No. 3,422,244 issued Jan. 14, 1969 entitled ELECTRIC BLANKET WITH A TEMPERATURE RESPONSIVE CONTROL CIRCUIT;

P. Lauck, III - U.S. Pat. No. 3,437,792 issued Apr. 8, 1969 entitled ELECTRIC HEATING DEVICE WITH TEMPERATURE CONTROL MEANS;

P. Lauck, III - U.S. Pat. No. 3,544,767 issued Dec. 1, 1970 entitled HEATING CONTROL CIRCUIT WITH SCR-UNIJUNCTION TRANSISTOR COMBINATION;

P. Lauck, III - U.S. Pat. No. 3,548,157 issued Dec. 15, 1970 entitled HEATING CONTROL CIRCUIT WITH TRIAC-DIAC COMBINATION; and P. Lauck, III - U.S. Pat. No. 3,564,206 issued Feb. 16, 1971 entitled FAIL SAFE SENSOR/OVERRIDE FOR CIRCUIT Further comprising prior art is a basic half wave phase control circuit appearing in Fourth Edition GE SCR Manual, pages 185-186. This latter utilizes phase control with a gate semi-conductor trigger device (SUS) as well as other gate trigger means as well as including a resistance potentiometer. The latter phase control circuits do not result in control snap on/off operation without any of many gate thyristor trigger means normally employed to avoid "latch" on or off instability, due to internal temperature build-up and consequent resistance change within thyristor itself.

SUMMARY OF THE INVENTION

The present invention is directed to a circuit for use in electric blanket control and wall temperature controls which provide control snap on/off operation. The control is on/off SCR rather than a phase control and utilizes no potentiometer. The present control further requires no gate semi-conductor trigger device (SUS etc.). The present circuit is for solid on/off control rather than phase control. Positive and negative temperature coefficient means are incorporated which override the series and parallel configurations regulatory temperature responsive means and are used with capacitive reactance circuitry rather than a gate semi-conductor type of operation. The circuit configuration and components are highly efficient in operation and less costly than heretofore known with more complex stage gain or shunt circuits.

The invention, in one aspect, also incorporates a double-stranded wire with two cores as a fail-safe for temperature responsive means which eliminate costly bi-metallic elements in blankets and places one or a plurality of temperature responsive means in the sleeping area and/or receptacle plug to provide a blanket or burner which is both safe and infinitely more sensitive than the present bi-metallic ambient temperature control boxes and the like.

Additional objects and advantages of the invention will be more readily apparent from the following detailed description of and embodiment thereof when taken together with the accompanying drawings in which.

It is to be understood that the drawings disclose an illustrative embodiment of circuits only, and the invention is in no way to be restricted thereto, since it is susceptible of broader application to different specific control circuits as referred to above, in patented and pending patent application embodiments or others.

The illustrated circuit has been selected to disclose the basic principle of operation of the invention and those skilled in the art can easily adapt this principle as illustrated to other circuits for the same overall concept and operation.

Figure 1:
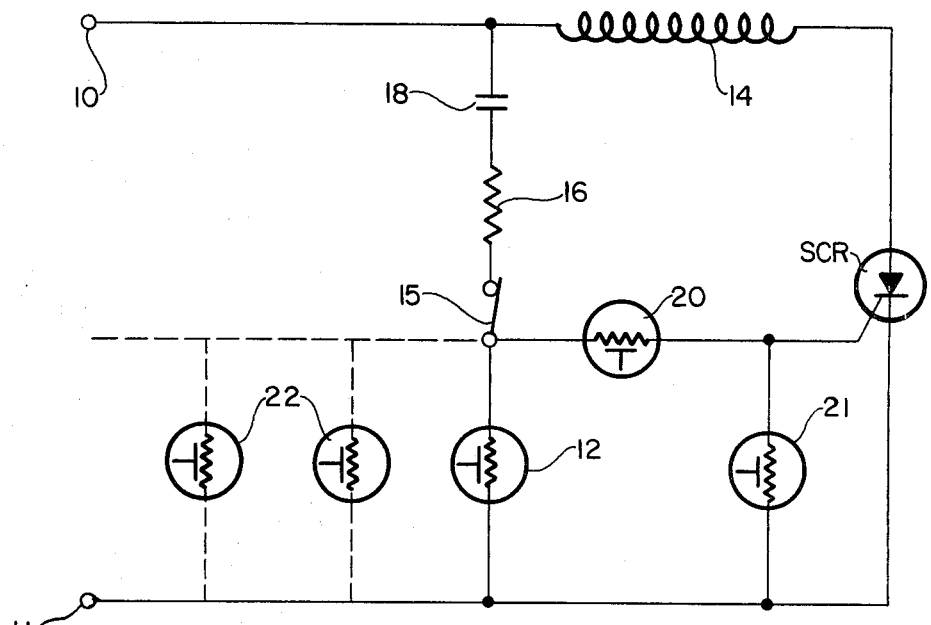
FIG. 1 is a schematic circuit in accordance with the invention.

In FIG. 1, the heat control circuit of the present invention as shown includes a conventional alternating current supply applied between input terminals 10 and 11, 10 being the hot line and 11 the ground. The circuit includes, in series connection, a heating coil 14 in a usual manner which is incorporated in the blanket or the like structure in any currently known fashion. Also, in series is an SCR which functions for on/off control rather than a phase control as in the GE circuit referred to as prior art. A voltage divider circuit includes a capacitor 18 which is less costly than a potentiometer voltage current regulator and having a different position from the said GE circuit. This circuit includes resistance 16 and temperature sensitive resistances, hereinafter sometimes called "temperature sensors" and "thermistors," 12, 20, 21 and 22 intermediate of which is an electromechanical switch 15. This switch 15 is used in the voltage divider circuit and is not a gate operation semi-conductor for an SUS, UTT pulse transformer, diode, diac etc. The combination of the switch 15 and the negative temperature responsive resistance 21 and the positive temperature responsive resistance 20 provides a fail-safe control regulator as hereinafter explained.

The use of at least one negative temperature sensor 12 and a plurality of negative and/or positive temperature sensors, or thermistors, 22, for wall wiring protection or blanket control is indicated. This control can consist of a double stranded override wire having an inner core of the wire attached to the temperature responsive means sensors or thermistors. An insulating layer covers the inner core and thereabout is an outer core which preferably is made up of the continuity of the ground line and/or other vital control area continued into the blanket in a plug of the receptacle and out of the other plug. As such, it is an extension of the third circuit ground line or other vital control means into the blanket and back to the control. Finally, around the outer core is a polyvinyl chloride coating (PVC), the resulting double-stranded wire being located in the temperature sensing area and constituting a fail safe part of the temperature responsive means. If the outer core breaks, the heater coil continuity is interrupted and cuts off main power. Since the inner core connects to the temperature sensors and the outer core is a continuous ground circuit, the inner core in fact is protected by a break in the outer core. It is impossible to have a break in the inner core without breaking the outer core. Electric blankets and the like in current use consist of bi-metallic thermostats but not solid state temperature responsive sensor means. Rather, bimetallics in the prior art serve to open in case of an overheated condition but are not positive temperature and negative temperature responsive regulators. The use of a double-stranded wire with two cores renders it possible to prevent thermal thyristor run away in the heretofore break of a solid state negative temperature coefficient sensor. A break in the outer core would thus automatically cut off the heater coil power.

This simple circuit constitutes a non-phase solid on/off control rather than phase control circuit as in the aforesaid GE circuit. The control is on/off thyristor SCR in that the control snaps on or off as opposed to the GE circuit. The circuit does not include a potentiometer and the control has no gate semi-conductor trigger device such as an SUS, etc. The miniature electro-mechanical screw adjusting temperature responsive means 15 is used here in conjunction with a capacitive reactance 18 coupled with resistive voltage 16 and trigger voltage divider circuit, rather than a gate semi-conductor as referred to above.

Figure 2:
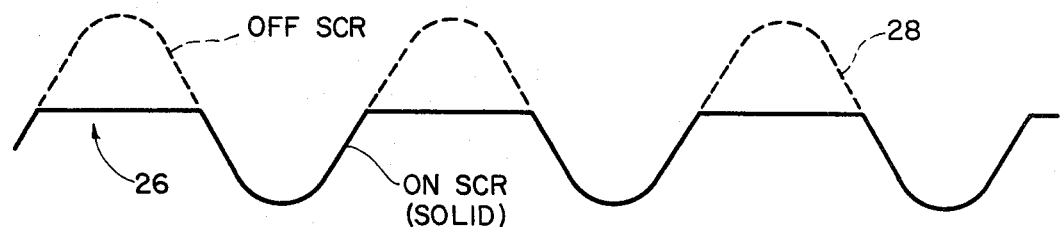
FIG. 2 is a wave diagram of a solid ON circuit condition.
Figure 3:
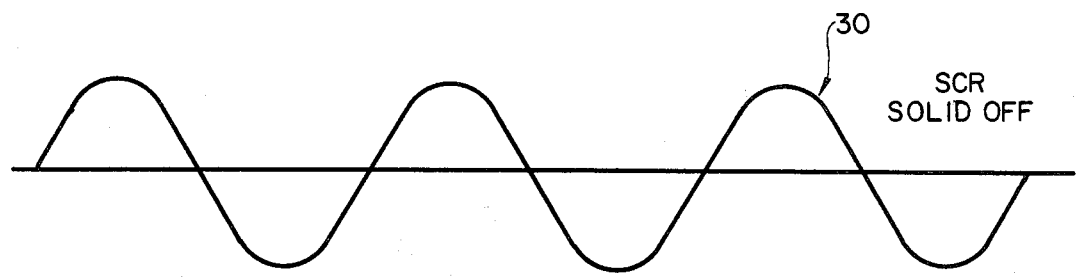
FIG. 3 is a view similar to FIG. 2 with a solid OFF circuit condition.

The voltage is in a non-phase control, snap on/off circuit as can be seen from an examination of FIGS. 2 and 3. In FIG. 2, there is shown a no phase angle with the solid ON SCR indicated at 26 which is a solid ON negative wave. The OFF thyristor SCR portion is indicated at broken lines at 28. A solid OFF condition of the thyristor SCR is indicated in FIG. 3 at 30.

It is also to be noted that the capacitor 18 in this circuit is repositioned with respect to the GE circuit and can be smaller and less costly than a potentiometer. Capacitive reactance coupled with resistive and temperature resistive sensor means provides instant voltage and current for triggering the thyristor SCR.

The invention also takes into consideration the fact that SOLID STATE THYRISTORS, SCR and TRIACS, and the like have the property of heating up and building up an internal thermal resistance when heated as opposed to their normal inoperative temperatures. When such occurs the drift and the settings of the parameters in the circuitry in which they are hooked changes markedly. This, therefore, has heretofore necessitated a mechanism called a gate trigger mechanism (SUS, DIAC, UNI-JUNCTION TRANSISTOR, DIODES, NEON BULBS AND THE LIKE). In each case, these trigger mechanisms generate enough voltage and current to trigger the gate of the thyristor SCR mechanism in such a manner that it reaches somewhere between its maximum and minimum forward voltage and current ratio to enable it to operate efficiently with dependability and lack of drift. Necessarily, this entails transistor amplifiers, differential amplifiers, resistors, diodes, and often other mechanisms to insure that the proper gate trigger mechanism operates at its assigned voltage such as with Zener diodes.

An innovation of this new circuit in being "self-compensating" is that on top of the anode, or perhaps, the case which becomes very hot, particularly in the G.E. circuit and in other thyristor units, there is placed physically both a negative temperate coefficient temperature sensor 21 and a positive temperature coefficient sensor 20. The negative temperature coefficient sensor 21 and the peak reverse blocking voltage of most thyristors is in the area of 5 volts. Since the negative temperature coefficient thermistor or sensor 21 is connected across gate to ground of the SCR or thyristor itself, it is in parallel with its like temperature sensing component 20 and components 12 and 22 in the blanket or other heating area (such as receptacle).

It is important to realize that the nominal resistance of a gate to ground thyristor resister is about 1,000 olms. This regiser prevents reverse current and voltage run away and consequent breakdown of the thyristor. The self-compensating means for an internally overheated thyristor when in a "on" condition is described. The negative temperature coefficient responsive means 21 works in conjunction with at least one positive temperature coefficient responsive means 20. Temperature responsive means 20 is in a series-parallel electrical configuration as demonstrated in the drawing, FIG. 1. Temperature responsive means 20 and 21 also work in conjunction with temperature responsive means 12, 22. Temperature coefficient resistance curves of the positive and negative temperature sensitive means are predetermined so that their steep resistive switching curves act in conformity with the normal maximum and minimum operating specifications of the thyristor current and voltage requirements as specified by the manufacturer. Since negative temperature responsive sensor 21 and at least one of the positive coefficient temperature responsive means, 20 or 22, should be of nominal olm value below 30° C and have little effect in the circuit at these temperatures. At least one positive temperature coefficient responsive means, 20, has a steep TCR and pronounced resistance increase above 30° C; thus, acting in conjunction with temperature responsive means 12 and 22 and other like sensor means 20 to prevent a heated thyristor or other local area temperature build up by increasing their resistance pronouncedly above a pre-set level. During such build up, the gate thyristor current is cut off, forcing said thyristor into an "off" condition. The positive temperature coefficient means 20, is mounted physically in proximity to or on the anode, case or tab of the thyristor, and increases in resistance when the thyristor heats up. Its increased resistance, depending on its switching TCR curve, cuts down the current flow of the thyristor gate current and works in conjunction with negative temperature coefficient sensor means 21. Sensor means 21 is also mounted in proximity to the anode, case or tab of the thyristor. The temperature resistive switching curves of resistance sensor means 21, 20, 12 and 22 are all different. Their electrical configuration compensates for the normal area temperature operating mode as well as a hot thyristor with internal temperature build up. Temperature responsive means 22 and 12 are also selected so that when placed strategically in the area of heated wire or heated area they also divide the current and voltage to the thyristor shown in the drawings. They thereby dictate and regulate the "on" and "off" condition of the thyristor to a pre-set level.

At the same time, at least one positive coefficient temperature sensor means 20 and negative temperatures coefficient temperature responsive means 21 work in conjunction with each other. They have different temperature resistive switching curves, however, which fundamentally change little in resistance at normal operating modes of both the heated areas as well as the thyristor itself. These different electrical resistance means have combinations of temperature responsive sensitivity which change their switching resistances drastically at temperature above 35° C. Whereas all temperature responsive means 12, 20, 21 or 22 interact as demonstrated in the unique drawing, FIGS. 1, 2, and 3, they operate at different points of TCR, and interrelate in an innovative manner so as to dictate an "on" and "off" state of the thyristor and cut off said thyristor when either it or a heated area exceeds a pre-set level. Thus the temperature responsive means, all with different resistive switching characteristics, maintain a balance, self-compensating condition in the heated area and thyristor itself.

Such a configuration as demonstrated in the drawing differs markedly from the normally closed by-metallic element used in present series heater wire configurations alone. The latter do not compensate for thyristor build-up, or regulate blanket area temperature as is shown herein. This circuit controls the gate thyristor current and voltage, maintaining temperature stability in the local heater area as well as compensating for the temperature in the thyristor itself. Such temperature stability is achieved by different TCR curves of temperature responsive sensing means acting from a nominally low resistance at lower normal operating temperatures to high, pronounced switching resistances at the higher abnormal mode or temperatures.

Negative coefficient temperature sensors 12 are constructed so as to be highly responsive within the potentially desired temperature range. These sensors 12 are electrically connected in parallel one to the other and are physically placed throughout the area whose temperature is to be regulated. When the temperature falls below that desired, the negative coefficient temperature sensors 12 reach such a value that so divides the voltages to trigger the thyristor SCR into an ON state. As the temperature in the area to be regulated raises, the division of voltages changes until the thyristor SCR is triggered into an OFF state.

Manifestly, minor changes in details of construction and arrangement of parts and circuitry, within the teachings of the present invention can be effected without departing from the spirit and scope of the invention as defined in and limited solely by the appended Claims.

I claim:

1. In an electrical heating system and control circuit therefor including a heating element, capacitive resistance voltage divider circuit means, at least one temperature responsive sensor and a heating element actuator, controllable by an in accordance with temperature responsive sensor to operatively energize and de-energize the heating element, the improvement comprising:
   A. A series-parallel positioning of temperature responsive sensor means associated with said actuator and electrically connected in said voltage divider circuit means; and
   B. Said capacitive resistance voltage divider circuit means including the series connection of a capacitor and resistors operable to break input voltage to a reference voltage adapted to trigger said actuator in snap "on" and "off" control.

2. A system as claimed in claim 1, said actuator comprising and SCR thyristor and said circuit having solid "on" and solid "off" conditions, the solid "on" of said SCR thyristor constituting a negative wave, said solid "off" SCR thyristor condition constituting a full sign wave.

3. A system as claimed in claim 2, said circuit voltage being a solid on/off control.

4. A system as claimed in claim 3, wherein at least one temperature responsive sensor is adapted to containment at the source of electrical energy to comprise the heat control period.

5. The system of claim 3, the temperature responsive sensor comprising a double layer coaxial wire, the outer layer of which contains the heating element, and the inner layer containing temperature responsive means whereby thermal run away of the thyristor is prevented in the event of a break in the wire and failsafe condition is maintained.

6. In a system as claimed in claim 3 and including a double layer coaxial wire having an inner core attached to and forming a portion of said temperature responsive means, an insulating layer over said core and an outer layer being formed as a continuity of the control area in the blanket and to the control therefor.

7. In a system as claimed in claim 6, said wire further including a polyvinyl chloride coating, functioning of said inner core being unaffected by breakage of said outer layer whereby the inner core is operable for control shut off.

8. A system as claimed in claim 1, said actuator comprising an SCR thyristor, a first positive and a first negative temperature co-efficient temperature sensors connected to said SCR thyristor gate node whereby internal solid state junction molecular change and temperature build up during thyristor conduction is compensated.

9. A system as claimed in claim 8, said first positive and first negative coefficient temperature sensors connected to the gate node of said SCR thyristor being physically located on or in proximity to said thyristor.

10. A system as claimed in claim 8, comprising said first negative and said first positive coefficient temperature sensors connected to the gate node of said SCR thyristor in parallel to at least one second negative coefficient temperature sensor positioned physically in the area where temperature is to be controlled.

11. A system as claimed in claim 10, comprising at least one second positive coefficient temperature sensor connected electrically in parallel to said second negative coefficient temperature sensor and being positioned physically in the area where over heating is likely to occur.

12. A system as claimed in claim 8, wherein said SCR thyristor, said first positive and said first negative temperature coefficient temperature sensors are grown together comprising a single component integrated chip or circuit.

* * * * *